US007698975B2

(12) United States Patent
Peot et al.

(10) Patent No.: US 7,698,975 B2
(45) Date of Patent: Apr. 20, 2010

(54) TABLE SAW WITH CUTTING TOOL RETRACTION SYSTEM

(75) Inventors: David G. Peot, Easley, SC (US); William C. Buck, Clemson, SC (US)

(73) Assignee: Techtronic Power Tools Technology Limited, Tortola (VG)

( * ) Notice: Subject to any disclaimer, the term of this patent is extended or adjusted under 35 U.S.C. 154(b) by 1210 days.

(21) Appl. No.: 10/720,990

(22) Filed: Nov. 24, 2003

(65) Prior Publication Data

US 2004/0159198 A1   Aug. 19, 2004

Related U.S. Application Data

(60) Provisional application No. 60/444,263, filed on Jan. 31, 2003.

(51) Int. Cl.
*B27B 5/29* (2006.01)

(52) U.S. Cl. .................. 83/58; 83/62.1; 83/DIG. 1; 83/477.3; 83/477.2

(58) Field of Classification Search .................. 83/62.1, 83/477.2, DIG. 1, 58, 472, 471, 471.3, 489, 83/477.3, 471.1, 471.2
See application file for complete search history.

(56) References Cited

U.S. PATENT DOCUMENTS

| 2,505,958 | A | * | 5/1950 | Grierson | 83/471.2 |
|---|---|---|---|---|---|
| 2,674,130 | A | * | 4/1954 | Spychalla | 74/16 |
| 2,719,547 | A | * | 10/1955 | Gjerde | 83/471.3 |
| 2,945,516 | A | * | 7/1960 | Edgemond, Jr. et al. | 83/473 |
| 3,013,592 | A | * | 12/1961 | Ambrosio et al. | 83/473 |
| 3,785,230 | A | * | 1/1974 | Lokey | 30/388 |
| 4,276,799 | A | * | 7/1981 | Muehling | 83/473 |
| 4,334,450 | A | * | 6/1982 | Benuzzi | 83/471.2 |
| 4,885,965 | A | * | 12/1989 | Weissman | 83/100 |
| 5,123,317 | A |   | 6/1992 | Barnes, Jr. et al. |   |
| 5,219,011 | A | * | 6/1993 | Speck | 144/136.1 |
| 2002/0017175 | A1 |   | 2/2002 | Gass et al. |   |
| 2002/0017181 | A1 |   | 2/2002 | Gass et al. |   |
| 2002/0017183 | A1 |   | 2/2002 | Gass et al. |   |
| 2002/0017184 | A1 |   | 2/2002 | Gass et al. |   |
| 2002/0020263 | A1 |   | 2/2002 | Gass et al. |   |
| 2002/0020265 | A1 | * | 2/2002 | Gass et al. | 83/62.1 |
| 2002/0020271 | A1 |   | 2/2002 | Gass et al. |   |
| 2002/0056350 | A1 |   | 5/2002 | Gass et al. |   |
| 2003/0000359 | A1 |   | 1/2003 | Eccardt et al. |   |
| 2003/0005588 | A1 |   | 1/2003 | Gass et al. |   |
| 2003/0090224 | A1 |   | 5/2003 | Gass et al. |   |

FOREIGN PATENT DOCUMENTS

DE   10107236   9/2002
GB   1132708   11/1968

* cited by examiner

*Primary Examiner*—Ghassem Alie
(74) *Attorney, Agent, or Firm*—Michael Best & Friedrich LLP

(57) ABSTRACT

A table saw has a movable cutting tool for cutting a workpiece in a cutting region. The table saw includes a detection system to detect one or more conditions between a person and the cutting tool and a retraction system associated with the detection system. The retraction system retracts the cutting tool away from the cutting region independently of the motor and disengages the cutting tool from driving rotation with the motor upon detection of the one or more conditions by the detection system.

10 Claims, 6 Drawing Sheets

TABLE SAW WITH CUTTING TOOL RETRACTION SYSTEM

This application claims the benefit of and priority from U.S. Ser. No. 60/444,263 filed Jan. 31, 2003, the entire contents of which is incorporated herein by reference.

The present invention relates to table saws and more particularly to a table saw with an improved retraction system for the saw blade.

BACKGROUND

Table saws are a type of woodworking machinery used to cut workpieces of wood, plastic, and other materials. Table saws include a flat surface or table with a circular saw blade extending up through a slot in the table. A user slides a workpiece on the table against and past the blade while the blade is spinning to cut the workpiece. It is desirable to provide a system to retract the blade in response to detection of one or more conditions.

SUMMARY

According to the present invention a table saw having a cutting region for cutting workpieces includes a motor driving a movable cutting tool for cutting workpieces in the cutting region, a control system including a logic controller, a detection system adapted to detect one or more conditions between a person and the cutting tool, and a reaction system associated with the detection system and the cutting tool wherein the reaction system is configured to retract the cutting tool at least partially away from the cutting region and to disengage the motor driving the cutting tool upon detection of at least one of the conditions by the detection system. Desirably, the motor indirectly drives the cutting tool so that the time to retract the cutting tool from the cutting region can be reduced. In addition, by providing an indirect driving of the cutting tool, the driving engagement of the cutting tool can be interrupted when the cutting tool is retracted.

DESCRIPTION OF THE INVENTION

Figure 1:
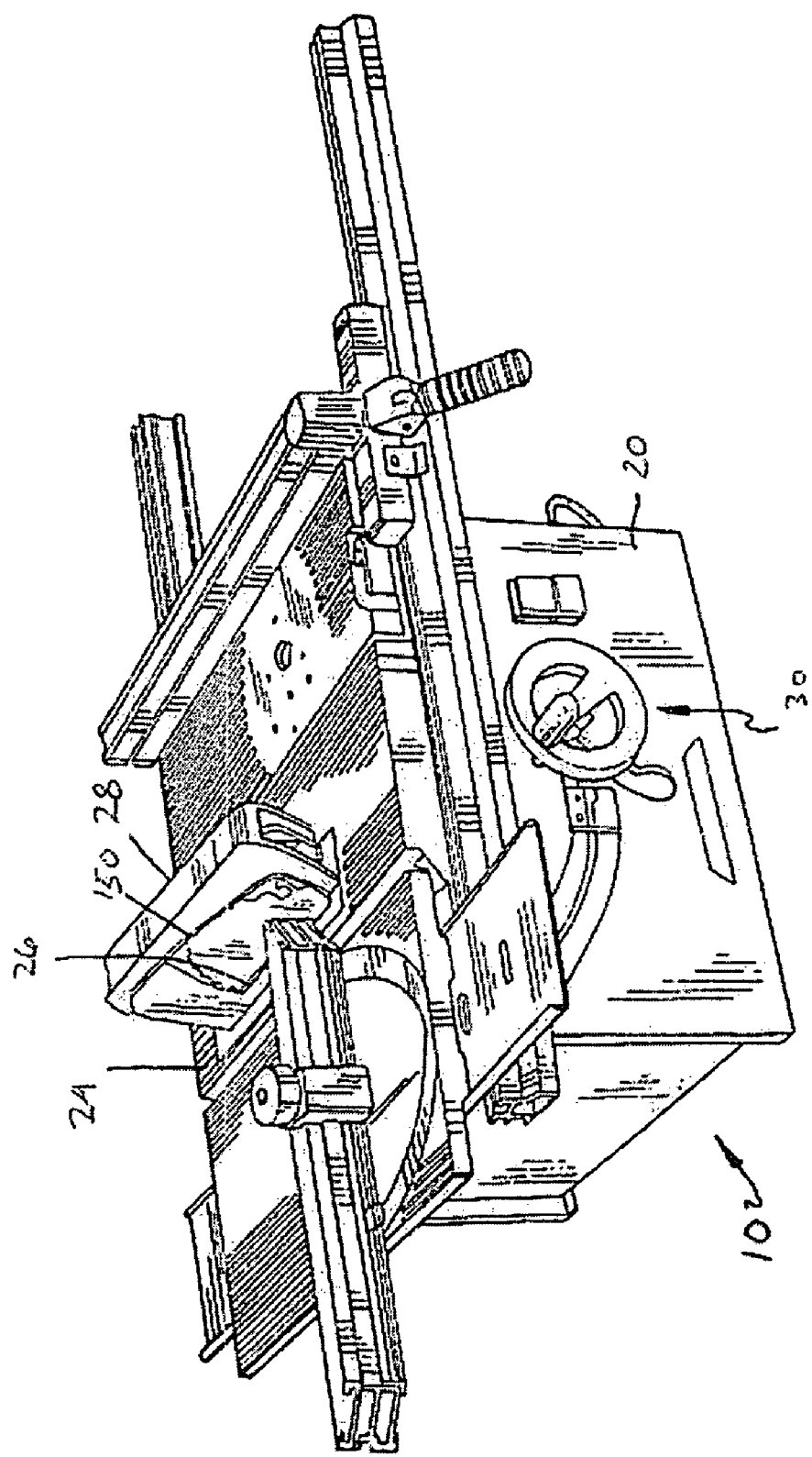
FIG. 1 shows an exemplary table saw that incorporates the retraction system of the present invention.

Referring now to FIG. 1, one type of table saw 10 is shown and it includes a support frame 20 on which is mounted a working table 24. As is conventional, the table saw 10 has a cutting assembly 130 which includes a motor 140 and a cutting tool 150 driven by the motor 140 (see FIG. 3). The working table 24 has an elongated generally rectangular opening 26 through which the cutting tool or blade 150 can project. The working table 24 may also have a blade guard 28, desirably formed of a transparent plastic material, for covering the exposed portion of the saw blade 150. A blade adjustment mechanism or handle 30 is mounted to the front of the support frame 20. The blade adjustment mechanism 30 can vary the extent by which the blade 150 projects above the surface of the working table 24 and to vary the inclination of the blade 150 relative the surface of the working table 24.

Figure 2:
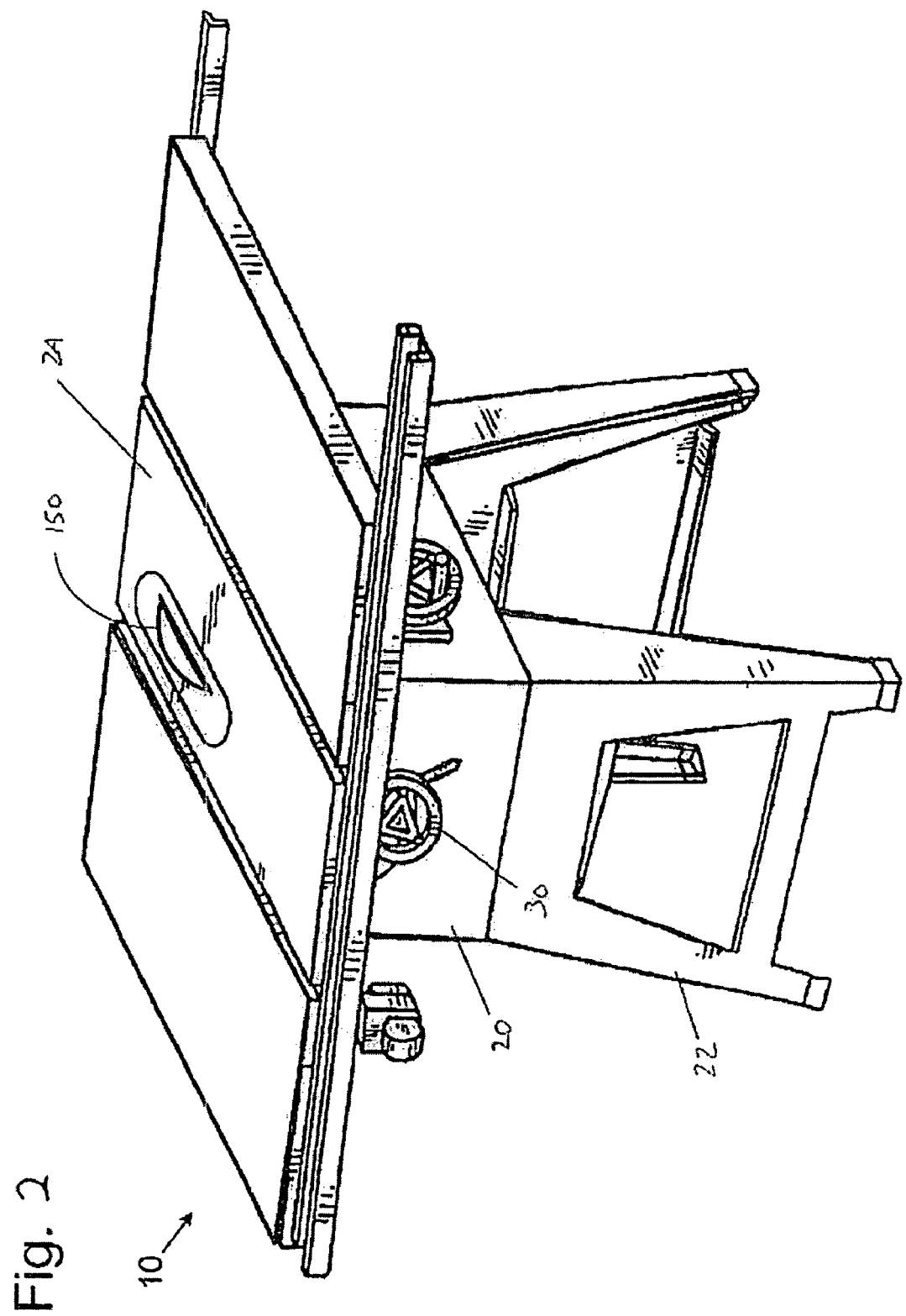
FIG. 2 shows another exemplary table saw that incorporates the retraction system of the present invention.

For ease of reference but without limiting the scope of the claims, the present invention will be described in connection with a table saw 10 of the type shown in FIG. 1. It is contemplated, however, that the features of the present invention will be equally applicable to the "contractors" type of table saw 10 depicted in FIG. 2. This type of table saw 10 includes, a working table 24 through which a blade 150 extends from beneath the table through an opening 26. The table 24 and blade 150 are supported by a frame 20 and legs 22. The frame 20 encloses the mechanics that support, position, and drive the blade 150. A motor 140 to drive the blade 150 can be positioned in or outside the frame 20. A blade adjustment mechanism, such as a handle 30, is used to adjust the position of the blade 150 relative to the table 24, for example, how far the blade 150 extends above the table 24 or how the blade 150 tilts relative to the top of the table 24.

Figure 3:
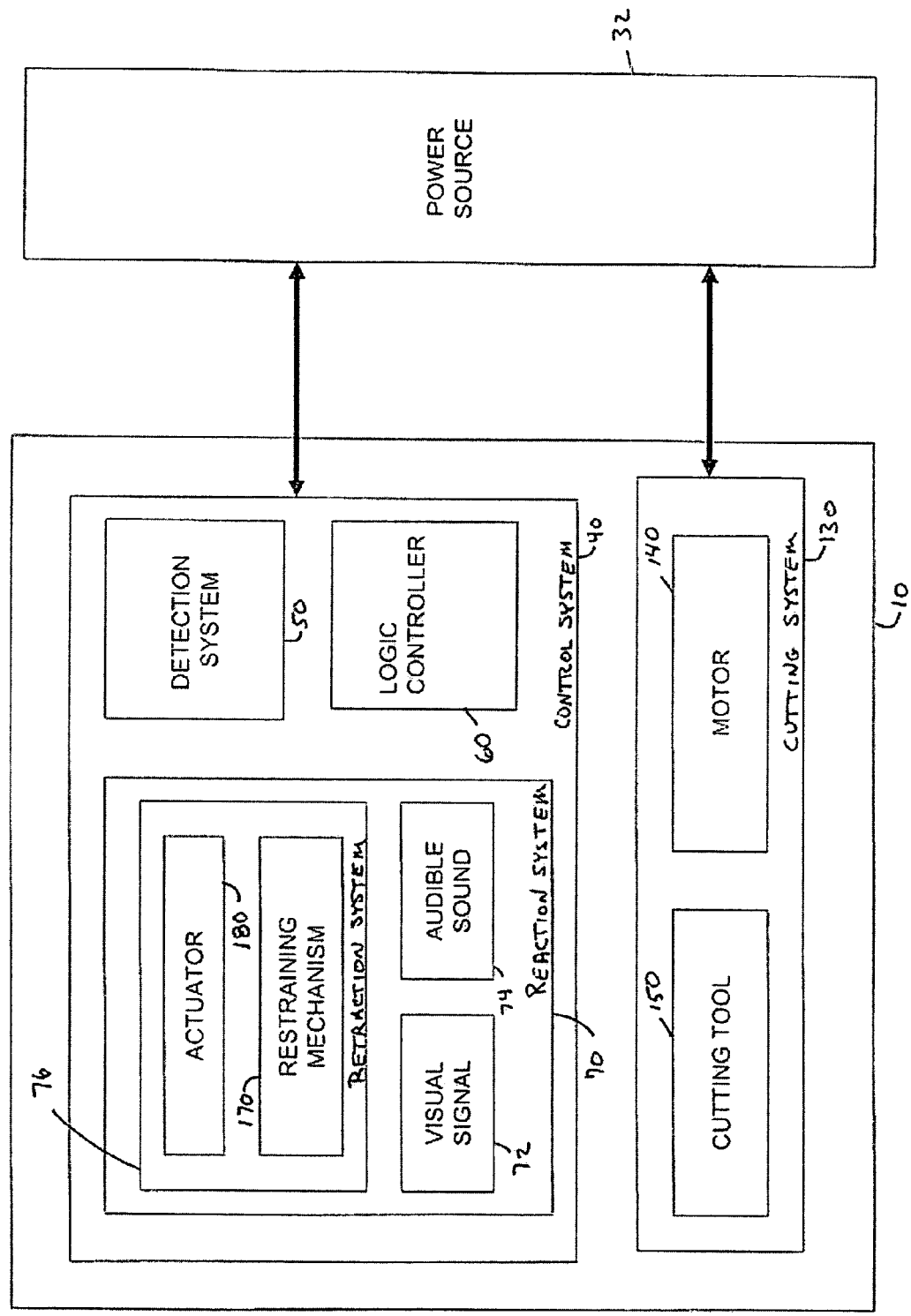
FIG. 3 is a schematic block diagram of the table saw in accordance with the present invention.

Turning now to FIG. 3, a schematic of the table saw 10 of the present invention is shown. The table saw 10 includes a power source 32, a cutting system 130 and a control system 40. The control system 40 includes a detection subsystem 50, a logic controller 60, and a reaction subsystem 70. The detection system 50 is adapted to detect one or more conditions such as the close proximity between a portion of the human body and the cutting tool 150. The detection system 50 may also be adapted to detect when the human body or a portion thereof such as a hand, is in close proximity to the opening 26 or the blade cover 28. When the detection system 40 detects one or more conditions, the control system 40 is configured to retract the blade 150 from a position extending above the top of the table 24 to a position below the table top 24. One embodiment of the control system is described in U.S. Ser. No. 60/444,263 filed Jan. 31, 2003, the entire contents of which are incorporated herein by reference.

The logic controller 60 is configured to control the table saw in response to the inputs it receives. For example, the logic controller 60 may be adapted to receive inputs from a variety of sources including the detection subsystem 50, the reaction subsystem 70, and the cutting system 130. The logic controller 60 may also include one or more sensors adapted to monitor selected parameters of the table saw.

In addition, the logic controller 60 typically includes one or more instruments operable by a user to control the table saw 10. The instruments may include start/stop switches, speed controls, direction controls, etc. The logic controller 60 may also be connected to receive the user's inputs via the various instruments as well as inputs from other sources (not shown) such as blade motion sensors, workpiece sensors, etc. to control the cutting system 130 and/or the reaction system 70. The logic controller 60 may have a predetermined response to the inputs received. For example, the logic controller 60 can activate various features of the reaction subsystem 70 depending on the detection signal received from the detection subsystem 50. In one embodiment of the control system 40, an output signal or series of signals activates at least one element within the reaction subsystem 70.

In another embodiment, the logic controller 60 can cause the reaction subsystem 70 to activate the retraction subsystem 76, disable movement of the cutting blade 150, activate a visual light 72 or audible sound 74, or rapidly effectuate any combination thereof. When the logic controller 60 outputs a signal to the reaction subsystem 70 to activate the retraction subsystem 76, the logic controller 60 can also send a signal to the reaction subsystem 70 to activate the retraction system 76, to provide the user with a visual signal 72 that a body part is in close proximity to the blade 150, blade guard 28, opening 26, or another area near the blade 150.

Once activated in response to a signal indicating the presence of one or more conditions, the reaction subsystem 70 is configured to retract the blade 150. The reaction subsystem 70 is configured to substantially simultaneously retract the blade 150 (move the blade to a position below the table top), disable a restraining mechanism 170, as well as optionally providing a visual light 72 and/or an audible sound such as a beeper 74.

As noted above, the table saw 10 includes a suitable power source 32 to provide power to the cutting system 130 and the control system 40. The power source 32 may be an external power source such as line current, or an internal power source such as a battery. Alternatively, the power source 32 may include a combination of both external and internal power sources. Furthermore, the power source 32 may include two or more separate power sources, each adapted to power different portions of the table saw 10.

Figure 4:
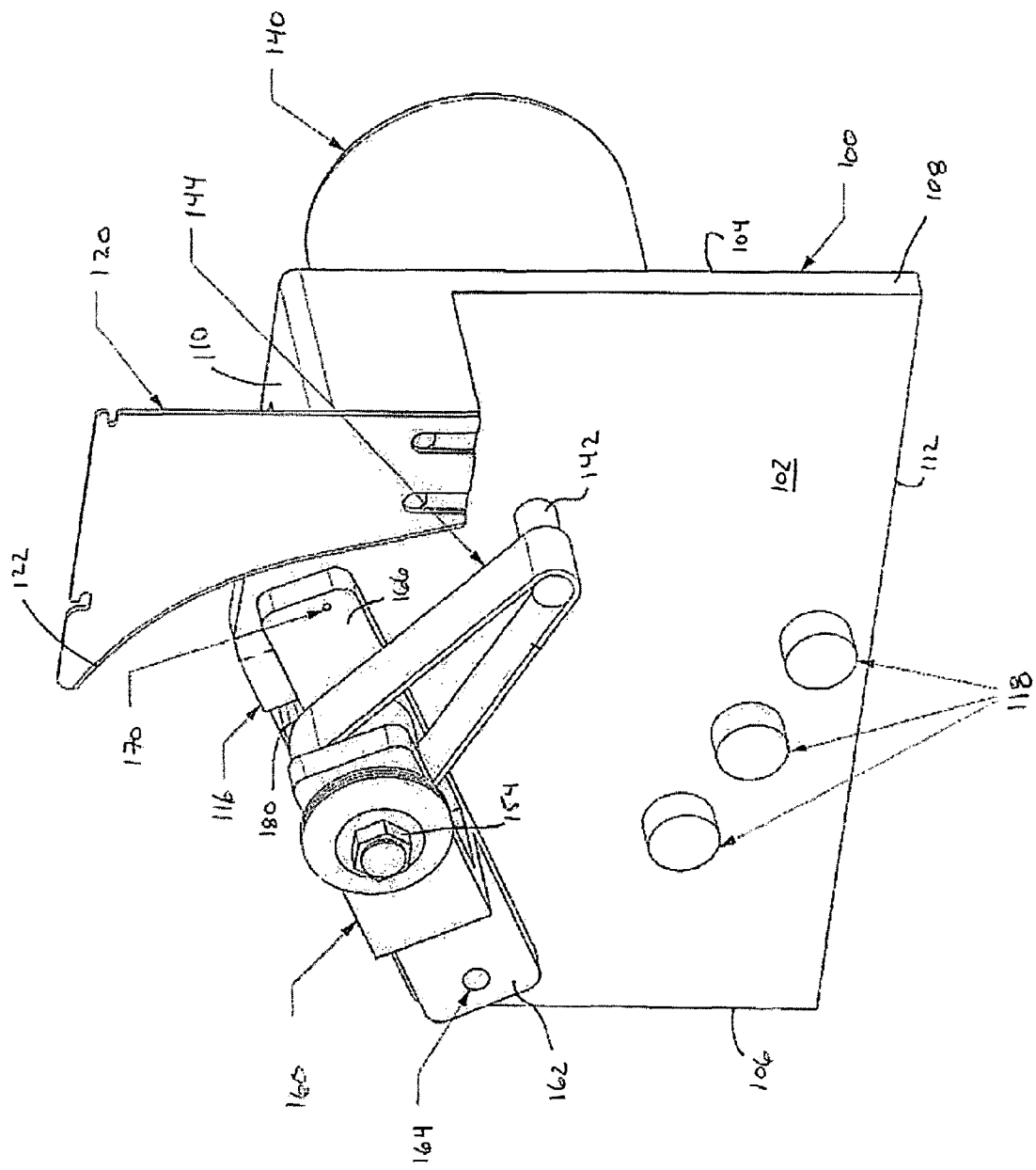
FIG. 4 is a fragmentary schematic perspective view of a table saw with a retraction system and with the blade removed to better show the system.

Turning now to FIG. 4 one embodiment of a table saw 10 with a reaction subsystem 70 that incorporates a retraction system 76 according to the present invention is shown. Advantageously, according to the retraction system 76 of the present invention, the blade 150 can be retracted below the table 24 without moving the motor 140. As a result, the energy or force to drop the blade 150 below the table 24 is reduced, which should allow the blade 150 to move downward very rapidly and possibly at a velocity greater than the approach velocity of the user. In addition, because the motor 140 is not moving with the blade 150, the energy required to be dissipated to stop the downward motion of the blade 150 is less, thus minimizing unwanted rebound of the blade 150. Moreover, by advantageously configuring the components of the retraction system 76, when the blade 150 is dropped (retracted), the blade 150 is no longer in driving engagement with the motor 140. As a result, the blade 150 will stop spinning and the need to dissipate the energy of the spinning motor 140 is eliminated.

Figure 6:
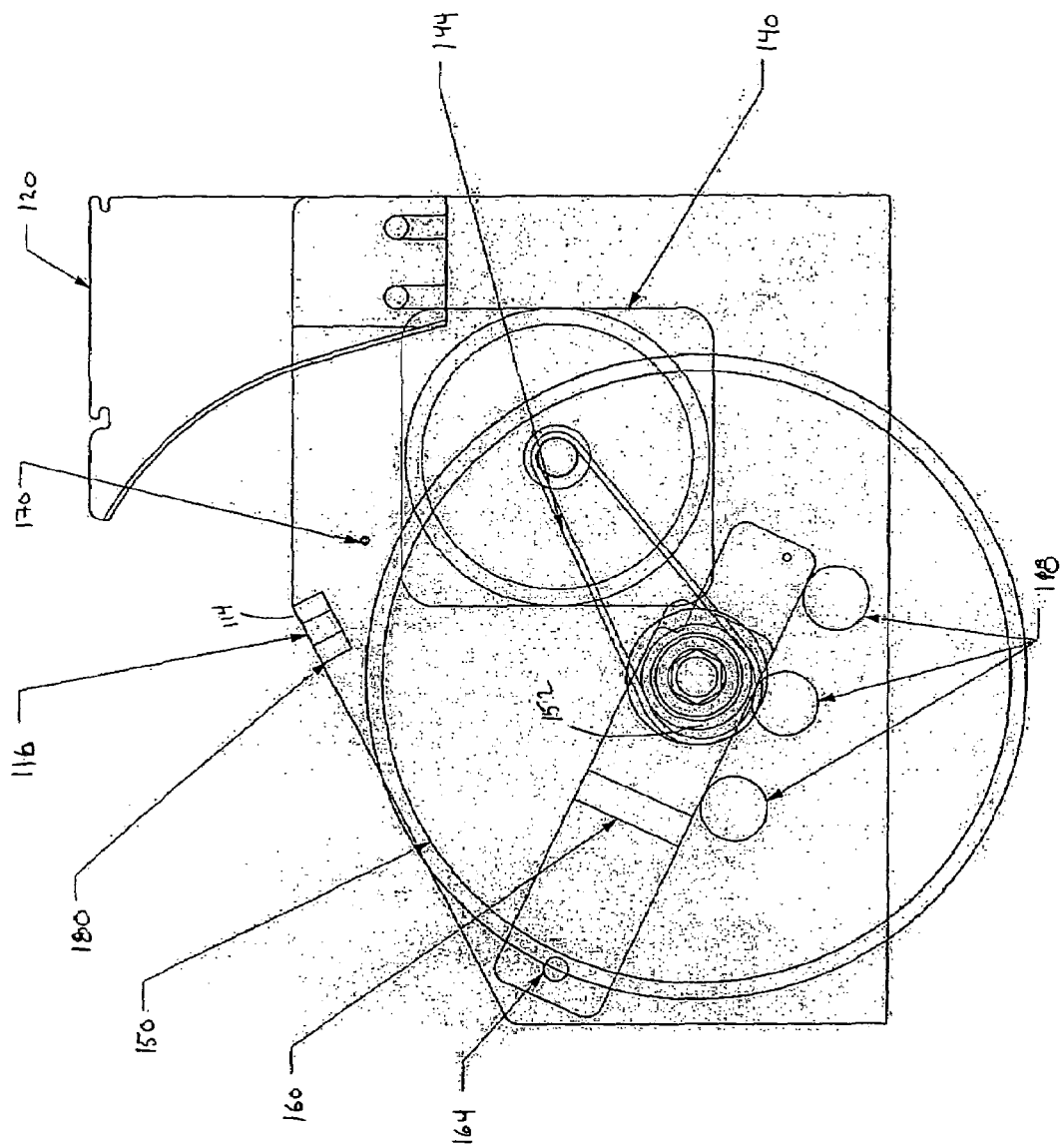
FIG. 6 is a fragmentary schematic side view of a table saw with a retraction system and with the blade in a retracted position.

The table saw 10 includes a trunion 100 to carry the motor 140, a riving knife 120, and the retraction system 76. The trunion 100 includes a first side 102, a second side 104, a front 106, a rear 108, a top 110, and a bottom 112. The trunion 100 also has an angled portion 114 that connects the top 110 with the front 106 and below which the blade 150 rests in the retracted position (See FIG. 6). The trunion 100 can be adjusted up or down or at an angle with respect to the top of table 24 by use of the adjustment mechanism or handle 30, as is known in the art. As a result, the blade 150 can be adjusted with respect to the top of the table 24.

The trunion 100 also is provided with an upper stop 116 located on the first side of the trunion 102 where the angled portion of the trunion 114 connects the top of the trunion 110. The upper stop 116 provides a stop for a swing arm 160 to preclude further upward pivoting of the swing arm 160 and thus further upward movement of the blade 150.

In a desired embodiment, the motor 140 indirectly drives the blade 150 through an arbor 152 upon which the blade 150 is secured by a nut 154 or similar fastener. A drive 144 connects a motor shaft 142 with the blade arbor 152. The drive 144 may be a belt, split-apart gear box, or other known driving mechanisms. The motor 140 is shown as being mounted on a side of the trunion opposite the blade 150 with the motor shaft 142 extending through an opening of the trunion. It will be understood, however, that the motor 140 can be conveniently located so long as motor 140 indirectly drives the blade 150 so that as the blade 150 retracts the blade arbor 152 will not be driven by the motor 140.

Figure 5:
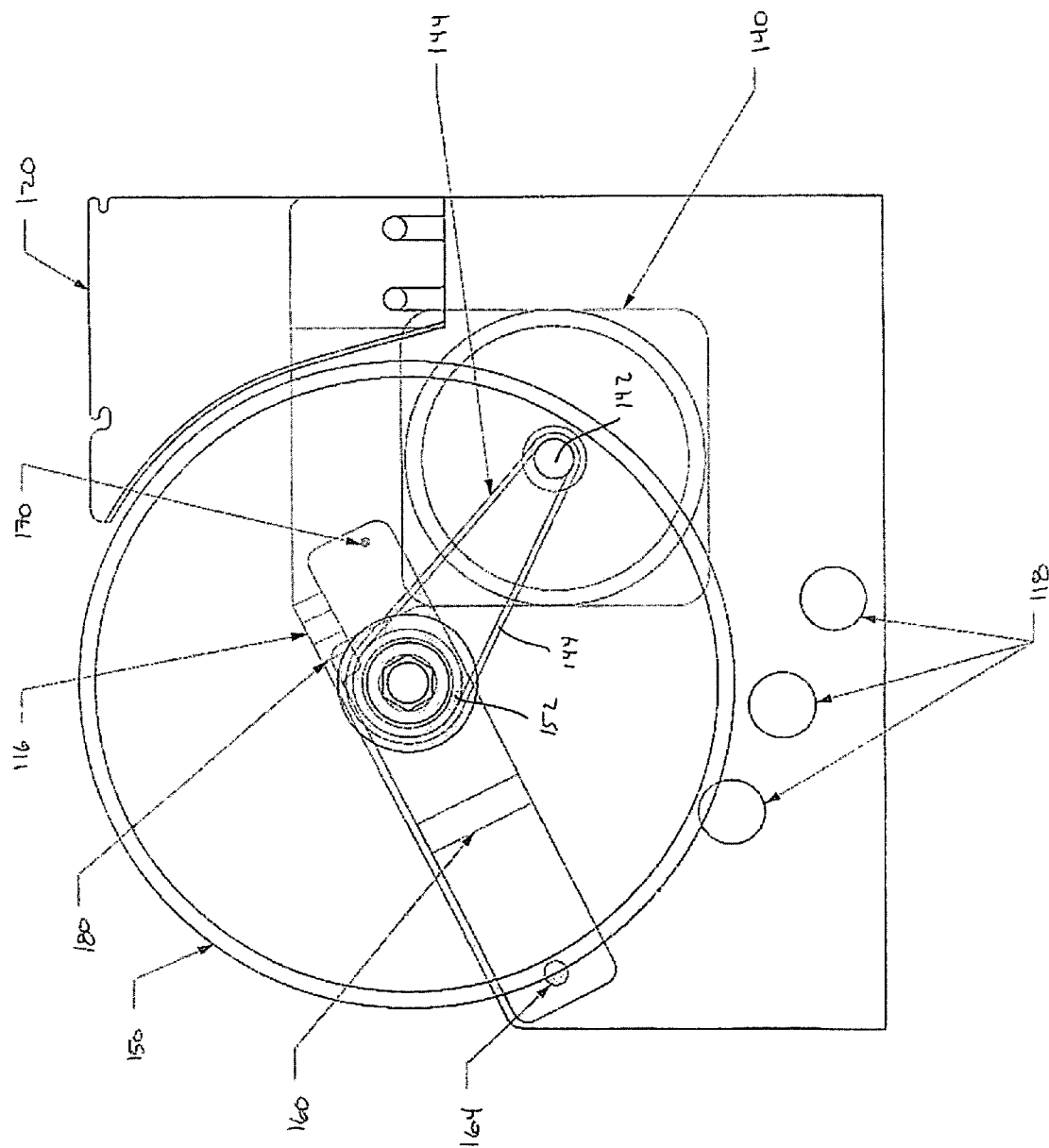
FIG. 5 is a fragmentary schematic side view of a table saw with a retraction system and with the blade in a cutting or operating position.

The blade arbor 152 is carried on the swing arm 160, which has a first end 162 and a second end 166 with the first end 162 being pivotally connected 164 to the front portion of the trunion 106. The pivotal connection 164 can be implemented in any known fashion so long as the swing arm 160 is free to pivot from a blade operating position (shown in FIG. 5) to a blade retracted position (shown in FIG. 6). In one embodiment, the swing arm 160 is at an angle of about 27.degree. from the horizontal when the blade 150 is in the operating position. It is contemplated that the swing arm 160 can be provided at different suitable angles depending on the requirements of the table saw 10 and the construction of the trunion 100.

A restraining mechanism 170 is operatively associated with the second end of the swing arm 166 to restrain the swing arm 160 from moving to the blade retracted position from the blade operating position. It will be appreciated that during operation of the blade 150 (i.e., cutting movement of the blade), the swing arm 160 will normally be urged in an upward direction. As a result, the restraining mechanism 170 need only provide sufficient force to retain the swing arm 160 and thus the blade 150 in the blade operating position, when the blade 150 is not moving. Suitable restraining mechanisms 170 include, but are not limited to, a shear pin, a spring loaded ball within a detent in the trunion 100 such that the ball engages a detent in the second end of the swing arm, or vice versa, a fusible material such as a nickel chrome wire, stainless steel wire, etc such that the fusible material melts under a predetermined electrical current density, a magnetic solenoid that is demagnetized either upon electrical activation or electrical deactivation or similar apparatus to restrain the swing arm 160 from downward movement.

The retraction system 76 also includes an actuator 180 that contacts the second end of the swing arm 166 to provide a downward force sufficient to overcome the restraining force of the restraining mechanism 170 to allow the swing arm to swing downwardly or to push the swing arm in a downward direction. For example, if the restraining mechanism 170 is a shear pin, the actuator 180 must provide a sufficient force to shear the pin and force the swing arm 160 in a downward direction. Desirably, in one embodiment, the actuator 180 provides a force greater than the restraining mechanism 170 force such that the additional force aids in the downward movement of the swing arm 160. Depending on the desired configuration, the actuator 180 may be activated or deactivated depending upon receiving a signal as an indication of detection of one or more conditions.

The actuator 180 may be any mechanism that can apply a force to the second end of the swing arm 166 sufficient to drive the swing arm 160 in a downward direction. In one embodiment, the actuator 180 is solenoid with a plunger such that when the solenoid is energized the plunger extends outward from the solenoid contacting a portion of the second end of the swing arm 166 to drive the swing arm 160 downward. Alternatively, the solenoid could be configured such that upon deenergization of the solenoid, the plunger extends outward.

In another embodiment, the actuator 180 may be an explosive charge. The explosive charge may be provided in a cavity formed on a portion of the trunion 100 adjacent the second end of the swing arm 166 such that the detonation energy is forced against the second end of the swing arm 166 to drive the swing arm 160 in a downward direction.

At least one lower stop 118 is provided to contact and stop the downward movement of the swing arm 160 and thus the saw blade 150 at a retracted position below the top of the table 24. The lower stop 118 is located on the same side of the trunion 100 as the swing arm 160 and is positioned so that the blade 150 may retract a sufficient distance. Desirably, the lower stop 118 is located such that the swing arm 160 is at angular distance from the horizontal that is less than the angular distance of the swing arm 160 when the blade is in the operating position. For example, if the swing arm 160 is at 27° from the horizontal when the blade is in the operating position, then the swing arm 160 should be at an angular distance less than −27° from the horizontal, e.g., about −25°. Advantageously, by providing this difference in angular distance, the drive 144 coupling motor shaft 142 with the blade arbor 152 will be disengaged (or loosened in the case of the belt) from the motor shaft 142. In other words, the motor 140 will not be driving the blade 150 when the blade 150 is in the blade retracted position.

In addition, because the swing arm moves or acts independently of the motor, the swing arm may be accelerated in a downward direction faster than if the swing arm moved with the motor. As a result, the blade should be retracted from the operating position faster than if the swing arm moved with the motor. In other words, the cutting tool and/or swing arm can move independently of the motor which can remain stationary or move independently of the cutting tool and/or swing arm.

Desirably, the lower stop 118 is formed of any of a number of impact-absorbing materials such as elastomeric materials, rubber, foams, plastics, etc. to minimize any upward rebound or bounce of the swing arm 160, which might cause the blade 150 to extend above the table top 24.

The riving knife 120 is provided at the rear of the trunion 108 and it extends upward from the top of the trunion 110. The riving knife 120 is secured in position to act as a shield for the rear portion of the blade 150. The riving knife 120 has a front portion 122 adjacent and spaced from the blade 150. The riving knife 120 is stationary with respect to the blade 150. The top of the front portion of the riving knife 122 follows the contour of the blade 150 but it is rearwardly tapered to allow the blade 150 to retract without contacting the riving knife 122.

The present invention is applicable to table saws and provides a control system wherein a cutting tool is retracted upon the occurrence of a specified one or more conditions, such as when it is detected that a portion of a human body is in proximity with the cutting tool. It is therefore intended that the foregoing detailed description be regarded as illustrative rather than limiting, and that it be understood that it is the following claims, including all equivalents, that are intended to define the spirit and scope of this invention.

The invention claimed is:

1. A table saw having a cutting region for cutting workpieces, comprising:
    a motor driving a movable cutting tool for cutting workpieces in the cutting region;
    a detection system adapted to detect one or more conditions;
    a reaction system associated with the detection system and the cutting tool wherein the reaction system is configured to retract the cutting tool at least partially away from the cutting region and to disengage the motor driving the cutting tool upon detection of at least one of one or more conditions by the detection system, wherein the cutting tool retracts independently of the motor; and
    a trunion that carries the motor and the cutting tool, wherein the trunion has a first side and a second side and wherein the cutting tool is mounted on the first side and the motor is mounted on the second side.

2. The table saw of claim 1 further comprising:
    a motor shaft extending from the motor to the first side of the trunion;
    an arbor carrying the cutting tool; and,
    a drive connecting the arbor and the shaft.

3. The table saw of claim 2 wherein the arbor is movable with respect to a top of the trunion.

4. The table saw of claim 3 wherein the arbor is in a driving engagement with the motor when the arbor is in a first position such that the cutting tool is in the cutting region.

5. The table saw of claim 4 wherein the arbor is out of driving engagement with the motor when the cutting tool is retracted.

6. The table saw of claim 5 further comprising a swing arm pivotally connected to the first side of the trunion near a front of the trunion, wherein the swing arm has a first end and a second end such that the swing arm pivots about the first end.

7. The table saw of claim 6 wherein the swing arm moves independently of the motor.

8. The table saw of claim 6 further comprising a restraining mechanism associated with the first side of the trunion and the second end of the swing arm, wherein the restraining mechanism provides a force to retain the cutting tool in the cutting region.

9. The table saw of claim 7 further comprising an actuator to act on the second end of the swing arm with a force sufficient to overcome the force provided by the restraining mechanism.

10. The table saw of claim 8 further comprising a stop provided on the first side of the trunion such that the swing arm is in contact with the stop when the cutting tool is retracted.

* * * * *